Aug. 5, 1930.	S. TIERNEY, JR	1,772,372
VERNIER ADJUSTING DEVICE
Filed July 18, 1927

INVENTOR
SAMUEL TIERNEY JR.
BY
ATTORNEY

Patented Aug. 5, 1930

1,772,372

UNITED STATES PATENT OFFICE

SAMUEL TIERNEY, JR., OF WESTFIELD, NEW JERSEY, ASSIGNOR TO RADIO CORPORATION OF AMERICA, A CORPORATION OF DELAWARE

VERNIER ADJUSTING DEVICE

Application filed July 18, 1927. Serial No. 206,432.

An object of the invention is to provide a vernier adjustment of simple construction and adapted for easy operation.

A further object is to provide a vernier adjustment in which both a coarse and a fine adjustment of a device may be effected by a single control means.

A still further object of the invention is to provide a novel arrangement of twisted or helical gearing in relation to an instrument or device requiring adjustment. Other objects of the invention will appear as the description proceeds.

Figure 1:
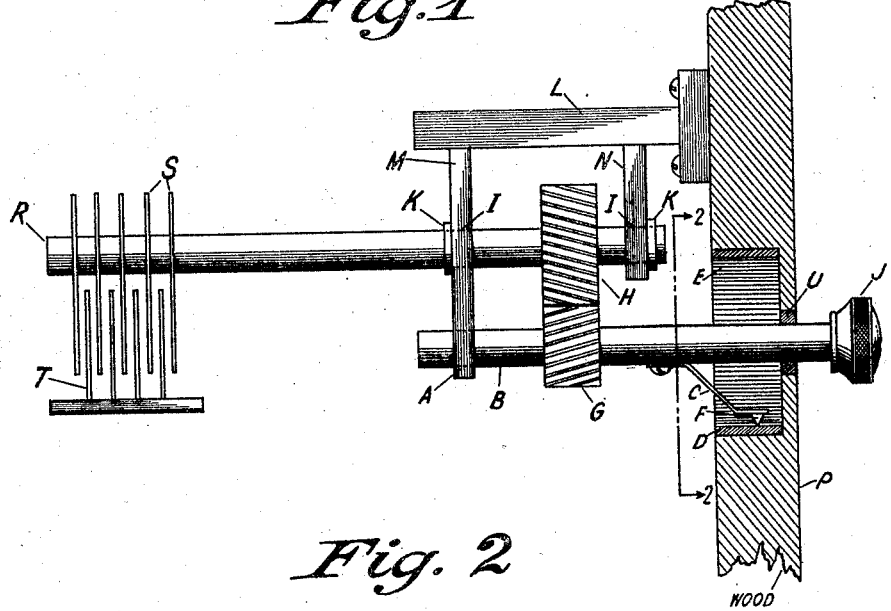

In the drawing Fig. 1 shows a side view of the device, partly in section.

Figure 2:
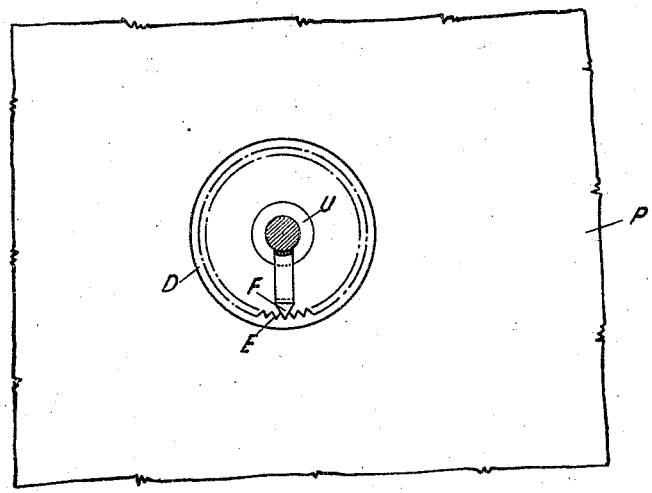

Fig. 2 is a section through line 2—2 of Fig. 1 looking in the direction of the arrows.

In the drawing P represents a portion of the panel of a radio set although when the adjusting device is used in other arts, it may represent any suitable supporting member. Secured to panel P in any suitable manner is a frame L having extensions or arms MN. These arms have two aligned bearings I and a lower bearing A. Journalled for rotation in bearings I is a shaft R carrying a set of movable condenser blades S which cooperate with the stationary blades T in the usual manner to form a variable condenser. Any suitable means is provided to prevent endwise motion of shaft R; in this embodiment I have shown enlargements or collars K secured to the shaft which contact with the outer faces of arms M and N, although it will be understood that any other known means may be used to prevent endwise motion of the shaft. Shaft R also has secured thereto in any desired manner a twisted or helical gear H.

Journaled for rotation and also for axial or endwise movement in bearing A and in a bushing U of metal or other suitable material inserted in an aperture in panel P, is a shaft B. Shaft B has secured thereto a twisted or helical gear G which has proper mesh with gear H and secured to the shaft in front of panel P is an adjusting knob or handle J. The rear of the panel is counterbored to provide an opening in which is secured an annular ring D which is concentric with bushing U. The inner surface of ring D is provided with a set of ratchet teeth E which lie parallel to the axis of shaft B. Teeth E should preferably be of considerably smaller circular pitch than the teeth of gears G and H.

Secured to shaft B is a spring C which has an enlarged head or end F shaped to contact with the sides of two adjacent teeth E, spring C forcing head F firmly into contact with the teeth. Spring C cooperating with ratchet E forms a brake to retain shaft B in adjusted position and while I have shown this specific brake any other desired brake may be used for this purpose. For example a band type of brake may be used, a circular band being carried by panel P and spring pressed into frictional engagement with shaft B or with a drum carried thereby.

While I have shown the teeth of twisted gears H and G as having an angle of about 20 degrees with their axis, it will be understood that a different angle may be used and where a very fine adjustment of the condenser S is required, I use an angle as small as 3 degrees. It will also be understood that this adjustment structure is not restricted to use with a variable condenser, as I may substitute for the movable plates S any other device which requires adjustment such as a variometer, the control arm of a rheostat, etc.

In the operation of the device the operator rotates knob J to get a coarse or approximate adjustment of condenser S the helical gear G transmitting the rotation to gear H in the usual manner. Having secured the coarse or approximate adjustment, in order to get a fine or precise adjustment the operator moves shaft B longitudinally or parallel to its axis by pushing or pulling knob J. In this motion shaft B is guided or held from rotation by the pressure of spring head F against teeth E and because of gears G and H having helical teeth, shaft R will be rotated only a small amount. The teeth of gear H may be regarded as projections on shaft R while those of gear G may be regarded as axial cams carried by shaft B or, vice versa, the teeth of H may be regarded as axial cams while the teeth of G are projections carried by shaft B. Viewed from either standpoint it is a gear tooth functioning as an axial cam which produces the fine adjustment.

What I claim as new and desire to secure by Letters Patent is:

1. In combination with a condenser having a fixed and an adjustable part, a control means mounted for both rotation and endwise movement, a rod connected to said control means, means for moving said rod endwise, a braking device a portion of which is carried by said rod for retaining said control means in adjusted position and means connecting said adjustable part and control means arranged to effect a coarse adjustment of said adjustable part by rotation of said control means and a fine adjustment by endwise movement thereof.

2. In combination with a condenser having an adjustable part, a control knob, accessible for engagement by the hand of the operator, means connecting said part and knob arranged to effect precise adjustment of said part by successive movements of rotation and axial movement of said control knob and a braking device arranged to retain said connecting means in adjusted position.

3. In combination with an adjustable device, a panel, a shaft, a control knob carried by said shaft mounted in front of said panel, a gear secured to said shaft at the rear of said panel, a stationary member, a spring pressed member connected to said shaft and engaging said stationary member, a second named gear connected with said device and in constant mesh with said first named gear said gears having helical teeth to rotate said device by either the rotation of or the endwise movement of said control knob.

4. In combination with a device to be rotatably adjusted, a projection connected thereto, a cam engaging said projection and a single control means for rotating and translating said cam longitudinally.

5. In an adjusting device, a driven member, a gear connected thereto, a second gear meshing with said first named gear means for rotating and translating said second gear and a braking device arranged to hold said second named gear in adjusted position.

6. In a device for adjusting a driven member, a gear connected to said member, a twisted gear meshing with said first named gear a control knob, a rod carrying said twisted gear and said control knob and means for preventing rotation of said twisted gear during its endwise movement.

7. The structure recited in claim 6 in combination with means for preventing endwise movement of said first named gear.

8. In an adjusting device, a projecting member, an axial cam engaging said member, means supporting said cam for both rotation and endwise movement, and manually operable means connected to said cam for selectively rotating and translating said cam.

9. The combination recited in claim 8 in combination with means for restraining said projecting member from endwise movement.

SAMUEL TIERNEY, Jr.